(No Model.)
J. W. CHISHOLM.
PIPE STOPPER.
No. 411,978. Patented Oct. 1, 1889.
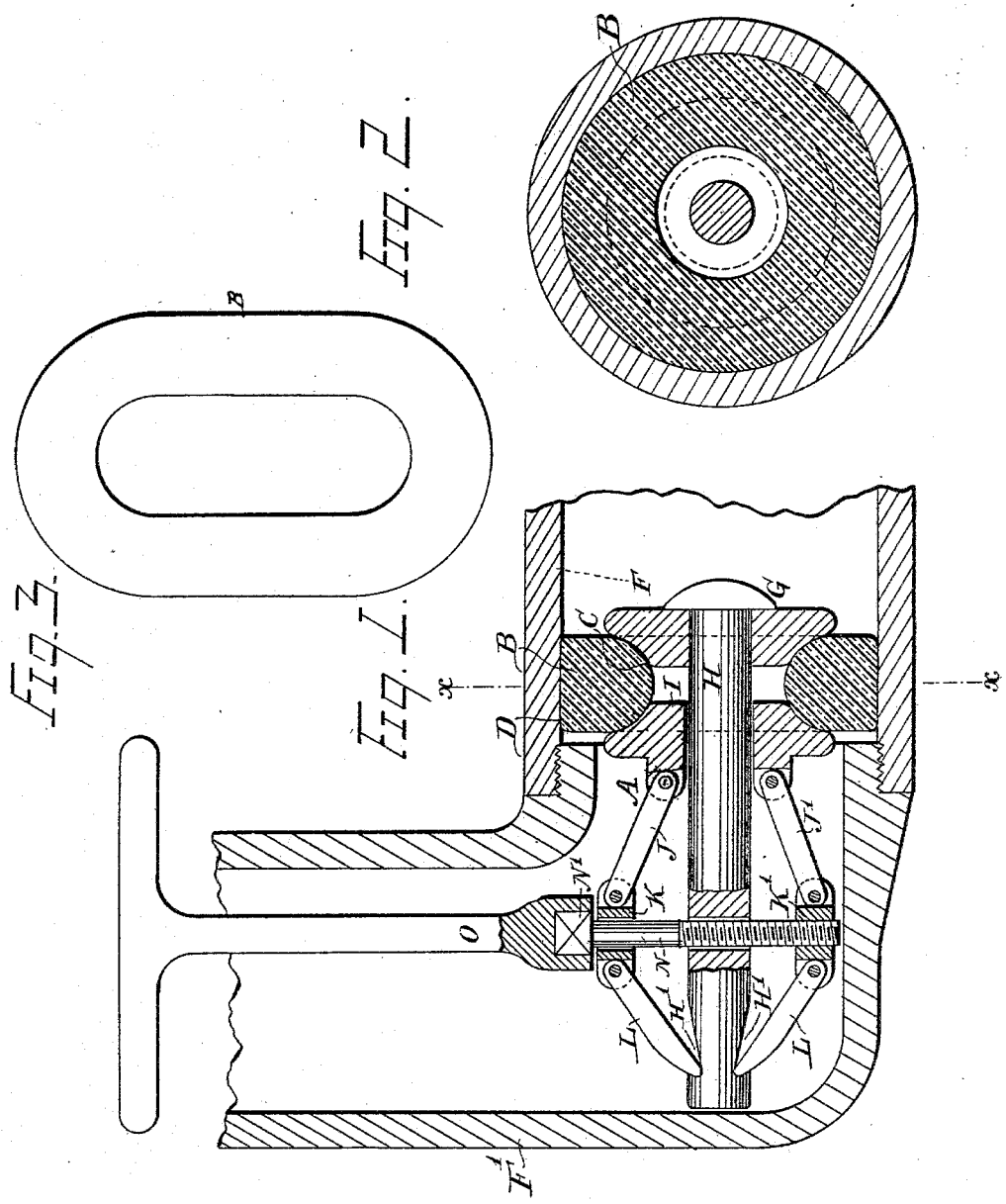
WITNESSES:
H. Walker
C. Sedgwick
INVENTOR:
J. W. Chisholm
BY Munn & Co.
ATTORNEYS.

UNITED STATES PATENT OFFICE.

JOHN W. CHISHOLM, OF LIVERPOOL, NOVA SCOTIA, CANADA.

PIPE-STOPPER.

SPECIFICATION forming part of Letters Patent No. 411,978, dated October 1, 1889.

Application filed April 16, 1889. Serial No. 307,404. (No model.)

*To all whom it may concern:*

Be it known that I, JOHN W. CHISHOLM, of Liverpool, in the county of Queens, Province of Nova Scotia, and Dominion of Canada, have invented a new and Improved Pipe-Stopper, of which the following is a full, clear, and exact description.

The object of the invention is to provide a new and improved plug or stopper, specially designed for securely closing or plugging up the end of a pipe, whether the latter has a smooth or a rough inner surface.

The invention consists of certain parts and details and combinations of the same, as will be hereinafter described, and then pointed out in the claims.

Reference is to be had to the accompanying drawings, forming a part of this specification, in which similar letters of reference indicate corresponding parts in all the figures.

Figure 1 is a sectional side elevation of the improvement as applied to two pipes standing at right angles to each other. Fig. 2 is a transverse section of the same on the line $xx$ of Fig. 1. Fig. 3 is a face view of a ring slightly compressed.

The improved pipe-stopper A is provided with a circular ring B, made of flexible material, such as rubber. The cross-section of the ring B is semicircular on its inner face C and square on its outer face D. On one side of the inner face C of the ring B is held a disk G, from which extends centrally a rod H, passing through the ring-opening and carrying a disk I similar to the disk G and pressing on the other side of the said ring B. The disks G and I are curved at their inner edges to conform to the shape of the inner face C of the ring, so that when the two disks G and I are pressed toward each other they expand the ring outward, so that the periphery of the latter will press against the inner surface of the pipe F, in which the pipe-stopper is to be used.

The disk I, as shown in Fig. 1, is held to slide on the rod H, and is pivotally connected at its outer face by links J and J' with collars K and K', respectively, pivotally connected opposite the links J and J' with the links L and L', respectively. The other ends of the latter fit into notches H', formed near the outer end of the rod H. The links J L J' L' and the collars K and K' form a toggle-joint for the disk I. The collar K' is preferably made with a screw-thread, in which screws a bolt N, passing loosely through the rod H and through the collar K. The head N' of the screw-rod N is adapted to be engaged by a key O for conveniently turning the said screw-rod N in order to operate the toggle-joint to press the disk I toward the disk G, or release it from the same whenever desired.

The operation is as follows: When the several parts are in place, the disk G rests centrally on one side of the ring B and the disk I is held on the opposite side, and when the operator now moves the disk I toward the ring by the toggle-joint, as shown in Fig. 1, then the two disks I and G press toward each other and against the inner face C of the ring B. The latter is thus expanded, and its periphery is firmly pressed in contact with the inner surface of the pipe F. The disks G and I close the central opening of the ring, and the latter forms a tight joint with the pipe F, so that any leakage from this end of the pipe is entirely prevented. It will further be seen that the device can be conveniently attached to a pipe connected with the pipe F', standing at right angles, as shown at Fig. 1, the pipe F' being of less diameter than the pipe F. In this case the screw-rod H, connected to the disk G, is passed into the pipe F, and the packing-ring B is then compressed, as shown in Fig. 3, and passed into the pipe F' and onto the bolt H until it rests against the disk G. The disk I, with the toggle-joint, is then passed into the pipe F' and onto the rod H, after which the screw-rod N is passed through the collar K and the rod H and screwed into the collar K'. By turning the key O the disk I is pressed up against the ring in the manner previously described. The key O can then be removed if necessary.

Having thus fully described my invention, I claim as new and desire to secure by Letters Patent—

1. A pipe-stopper comprising a flexible packing-ring having the inner half of its cross-section semicircular, a disk fitting onto one side of the said semicircular cross-section and closing the central opening of the packing-ring, a rod extending centrally from the said disk and passing through the central opening of the packing-ring, a second disk held on the said rod and adapted to be moved onto the packing-ring opposite the other disk, a toggle-joint connected with the said second disk, and a screw-rod for operating said toggle-joint, substantially as shown and described.

2. A pipe-stopper comprising a flexible packing-ring, two disks at opposite sides of said ring and closing its opening, the disks being rounded or inclined to expand the ring when forced together, a headed rod passed through the disks, opposite toggles connecting the outer end of the rod with the adjacent end of the disk and provided with collars at their joints, one collar being threaded, and the operating screw-rod passing through one of said collars and rod and engaging the opposite threaded collar, substantially as set forth.

3. A pipe-stopper comprising a flexible packing-ring B, the disks G I at opposite sides thereof, the rod H, passed through said disks and having a head bearing on disk G, an aperture near its opposite end and opposite notches H' H', the links J, hinged to the disk I, the links L, engaging the notches H', the collars K K', connecting the links J L and the screw N, passed through the collar K and aperture in rod H into the threaded collar K', substantially as set forth.

JOHN W. CHISHOLM.

Witnesses:
JOHN ALLAN,
JOHN GEORGE PYKE.